United States Patent
Feng et al.

(10) Patent No.: US 10,635,713 B2
(45) Date of Patent: Apr. 28, 2020

(54) METHOD AND DEVICE FOR REPLACING THE APPLICATION VISUAL CONTROL

(71) Applicant: Tencent Technology (Shenzhen) Company Limited, Shenzhen (CN)

(72) Inventors: Cheng Feng, Shenzhen (CN); Bo Hu, Shenzhen (CN); Xi Wang, Shenzhen (CN); Ruiyi Zhou, Shenzhen (CN); Zhipei Wang, Shenzhen (CN); Kai Zhang, Shenzhen (CN); Xin Qing, Shenzhen (CN); Huijiao Yang, Shenzhen (CN); Ying Huang, Shenzhen (CN); Yulei Liu, Shenzhen (CN); Wei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1109 days.

(21) Appl. No.: 14/824,740

(22) Filed: Aug. 12, 2015

(65) Prior Publication Data
US 2015/0347462 A1    Dec. 3, 2015

Related U.S. Application Data

(63) Continuation of application No. PCT/CN2014/080712, filed on Jun. 25, 2014.

(30) Foreign Application Priority Data

Jun. 27, 2013   (CN) .......................... 2013 1 0261512

(51) Int. Cl.
*G06F 16/583*    (2019.01)
*G06K 9/62*    (2006.01)
(Continued)

(52) U.S. Cl.
CPC ...... *G06F 16/5838* (2019.01); *G06F 3/04842* (2013.01); *G06F 9/44505* (2013.01);
(Continued)

(58) Field of Classification Search
CPC ........... G06F 17/30256; G06F 16/5838; G06F 16/583; G06F 9/451; G06F 9/44505;
(Continued)

(56) References Cited

U.S. PATENT DOCUMENTS 7,697,161 B2 *   4/2010   Choi ................... G06F 3/04845
                                                        358/1.18
8,089,515 B2 *   1/2012   Chebil .................. G03B 13/36
                                                        348/169
(Continued)

FOREIGN PATENT DOCUMENTS

CN     102572046 A     7/2012
CN     102938863 A     2/2013
(Continued)

OTHER PUBLICATIONS

International Search Report and Written Opinion dated Sep. 26, 2014 for International Application No. PCT/CN2014/080712, 9 pages.
(Continued)

*Primary Examiner* — Huawen A Peng
(74) *Attorney, Agent, or Firm* — Brinks Gilson & Lione

(57) ABSTRACT

A method, device, and system are provided for change the application visual control. In the method: the terminal device obtains an image of a current scene. The terminal device performs intelligent matching on the image of the current scene and replaces the application visual control based on a result of intelligent matching. The system includes a device having a hardware processor and a non-transitory storage medium. The system also includes a
(Continued)

database configured to store a plurality of subjects and corresponding pictures.

18 Claims, 3 Drawing Sheets

(51) Int. Cl.
    *G06T 11/60*     (2006.01)
    *G06K 9/46*     (2006.01)
    *G06F 9/451*     (2018.01)
    *G06F 9/445*     (2018.01)
    *G06F 3/0484*     (2013.01)
    *H04M 1/725*     (2006.01)

(52) U.S. Cl.
    CPC ............ *G06F 9/451* (2018.02); *G06F 16/583* (2019.01); *G06K 9/4661* (2013.01); *G06K 9/6201* (2013.01); *G06T 11/60* (2013.01); *H04M 1/72522* (2013.01); *H04M 2250/52* (2013.01)

(58) Field of Classification Search
    CPC ... G06F 3/04842; G06T 11/60; G06K 9/4661; G06K 9/6201
    USPC ........................................................ 707/722
    See application file for complete search history.

(56) References Cited

U.S. PATENT DOCUMENTS

| | | | |
|---|---|---|---|
| 8,743,145 B1* | 6/2014 | Price | G06T 19/006 345/633 |
| 2010/0245596 A1* | 9/2010 | Tirpak | H04N 1/00405 348/207.1 |
| 2011/0148917 A1* | 6/2011 | Alberth, Jr. | G09G 5/14 345/629 |
| 2012/0173986 A1* | 7/2012 | Jung | G06F 9/451 715/733 |
| 2012/0212619 A1* | 8/2012 | Nagamune | H04N 5/2256 348/164 |
| 2013/0103665 A1* | 4/2013 | Kasterstein | G06F 3/04817 707/706 |
| 2013/0286244 A1* | 10/2013 | Tirpak | H04N 5/225 348/222.1 |
| 2014/0108951 A1* | 4/2014 | Dharawat | G06F 9/4451 715/747 |
| 2014/0304629 A1* | 10/2014 | Cummins | A61B 5/742 715/764 |
| 2016/0050397 A1* | 2/2016 | Di Giamberardino | H05B 37/0227 315/149 |

FOREIGN PATENT DOCUMENTS

| | | |
|---|---|---|
| CN | 102946491 A | 2/2013 |
| CN | 102970364 A | 3/2013 |
| CN | 103064713 A | 4/2013 |
| CN | 103176761 A | 6/2013 |
| CN | 103366186 A | 10/2013 |
| CN | 103389897 A | 11/2013 |

OTHER PUBLICATIONS

Office Action dated Aug. 8, 2017 for Chinese Application No. 201310261512.9, 7 pages.

* cited by examiner

METHOD AND DEVICE FOR REPLACING THE APPLICATION VISUAL CONTROL

CROSS-REFERENCE TO RELATED APPLICATIONS

This application is a continuation of International Application No. PCT/CN2014/080712, filed on Jun. 25, 2014, which claims priority to Chinese Patent Application No. 201310261512.9, filed on Jun. 27, 2013, both of which are hereby incorporated by reference in their entireties.

FIELD

The present disclosure relates to the field of applications, and in particular, relates to a method and device for replacing the application visual control.

BACKGROUND

In order to satisfy the constantly changing demands of users and markets, there are now more and more applications available that allow users to customize corresponding modules, such as the corresponding graphical user interface (GUI) resource in the program, such that the user can choose to make a replacement with the skin he/she prefers or with the corresponding functional control, and can choose to delete the functions not needed, etc. This makes the application fully serve the user in terms of visual and functional experience, and has at the same time increased the favorability and the sense of usage achievement of the user in relation to the application.

The ability to customize products is the basic function that many applications currently have, and the function allows the user to customize some functions of the product based on need, such as replacing the visual controls, including wallpaper and icons. This function can enhance the sense of participation of the user in relation to the product, and can easily bring into being the emotional resonance of the user with the product. Currently, many products allow the user to add self-defined picture content into the visual interface of the products.

The existing method for replacing the application visual control generally requires selection of a certain option in a fixed list, and triggers the visual control replacement through the corresponding operation. This mode is relatively tedious, and the visual controls that can be selected for replacement are very limited.

SUMMARY

The present disclosure has provided a method and device for replacing the application visual control, and can more conveniently replace the definable visual control in the application.

In a first aspect, a method is provided for replacing the application visual control. In the method: the terminal device obtains an image of a current scene. The terminal device performs intelligent matching on the image of the current scene and replaces the application visual control based on a result of intelligent matching.

In a second aspect, a device is provided for replacing the application visual control. The device includes: a picture acquisition module, an intelligent matching module, and a visual control replacement module. The picture acquisition module is configured to obtain an image of a current scene. The intelligent matching module is configured to perform intelligent matching on the image of the current scene. The visual control replacement module, configured to replace the visual control of the application based on a result of the intelligent matching.

In a third aspect, a system is provided that includes a device having a hardware processor and a non-transitory storage medium configured to store the following modules implemented by the processor. An application in the device is configured to retrieve, present, and transfer online information. A database is configured to store a plurality of subjects and corresponding pictures. The device is configured to: obtain an image of a current scene; perform intelligent matching on the image of the current scene; and change a visual control of the application based on a result of the intelligent matching.

BRIEF DESCRIPTION OF THE DRAWINGS

To better explain the scheme of the present disclosure, the accompanying drawings necessary for the illustration of example embodiments of the disclosure are briefly described below, and it is apparent to those of ordinary skill in the art that the accompanying drawings only illustrate some embodiments of the disclosure and that other drawings may be obtained according to the accompanying drawings without any innovative efforts.

DETAILED DESCRIPTION OF THE DRAWINGS

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising,"

when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

For a better understanding of the aim, schemes and advantages of the present disclosure, example embodiments thereof are described in detail in connection with the accompanying drawings as follows.

Figure 1:
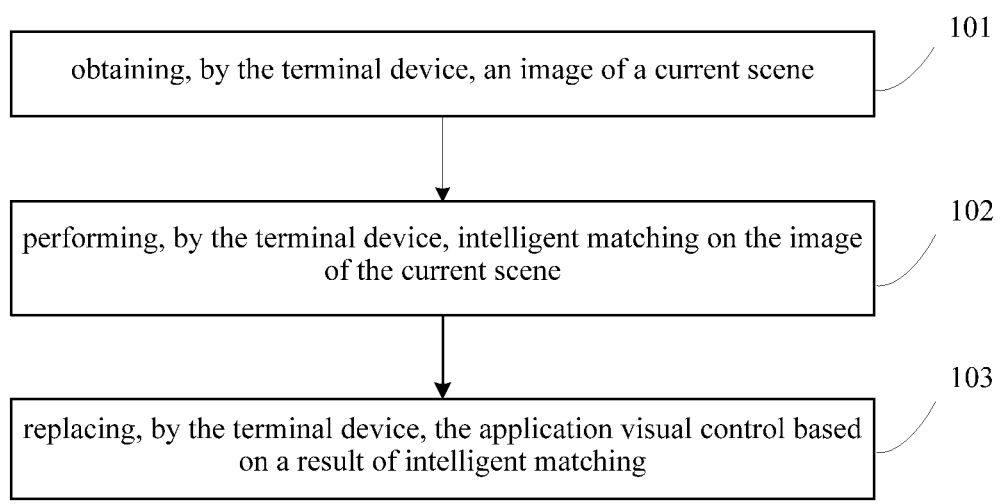
FIG. 1 is an example flowchart of the method for replacing the application visual control as brought forth in the present disclosure.

The present disclosure brings forth a method for replacing the application visual control, and the realization flowchart for the method is as shown in FIG. 1, which includes:

Step 101: The terminal device obtains an image. The image may include an image of a current surrounding scene of the device. For example, the terminal device may extract the stored picture file or use its camera to acquire the image of the current scene. This step may happen automatically and periodically according to a user instruction or setup configuration in the device. For example, the device may take a picture of its surrounding environment every hour or every thirty minutes to obtain a picture of its surrounding scene.

Step 102: The terminal device performs intelligent matching on the image of the current scene. For example, the terminal device may extract features from the image of the current scene. The features may include color information and content information.

Step 103: The terminal device replaces the application visual control based on a result of intelligent matching. The application may include a web browser, a social network application, or any application in the device. The web browser application is configured to retrieve, present, and transfer online information. The social network application is configured to share information among online friends in at least one social network.

For example, the terminal device may replace the visual control of the application based on the picture file or the image of the current scene. The terminal device may also perform intelligent matching on the picture file or the image of the current scene, and replace the visual control of the application based on the result of intelligent matching.

The device may replace the application visual control based on the picture file or the image of the current scene may include:

Editing and adjusting the picture file or the image of the current scene, and using the picture generated after editing and adjustment as the background image of the application.

Therein, the mode for editing and adjusting the picture file or the image of the current scene may include: Performing cropping, brightness adjustment, color adjustment or contrast adjustment etc. on the picture file or the image of the current scene.

In order to realize intelligent matching on the picture file or the image of the current scene as acquired, pictures belonging respectively to different subjects as well as the corresponding relations of colors or parts with subjects are stored in advance in local or remote servers.

The device performs intelligent matching on the picture file or the image of the current scene may include: Acquiring the key color or the key part of the picture file or image of the current scene, finding the corresponding relation stored in advance of the color or part with the subject based on the key color or key part, acquiring the subject to which the key color or key part corresponds, and using the picture belonging to the subject as the result of intelligent matching;

The mode for replacing the application visual control based on the result of intelligent matching may include: Displaying the result of the intelligent matching, and selecting one picture therein as the background image of the application based on the user instruction.

In the method, the mode for performing intelligent matching on the picture file or the image of the current scene may further include:

Acquiring the information on the current position or the current light condition, selecting the picture that matches the information on the current position or current light condition from the pictures belonging to the subject to which the key color or key part corresponds, and using the selected picture as the result of intelligent matching.

Example embodiments are given below for a detailed introduction.

Figure 2:
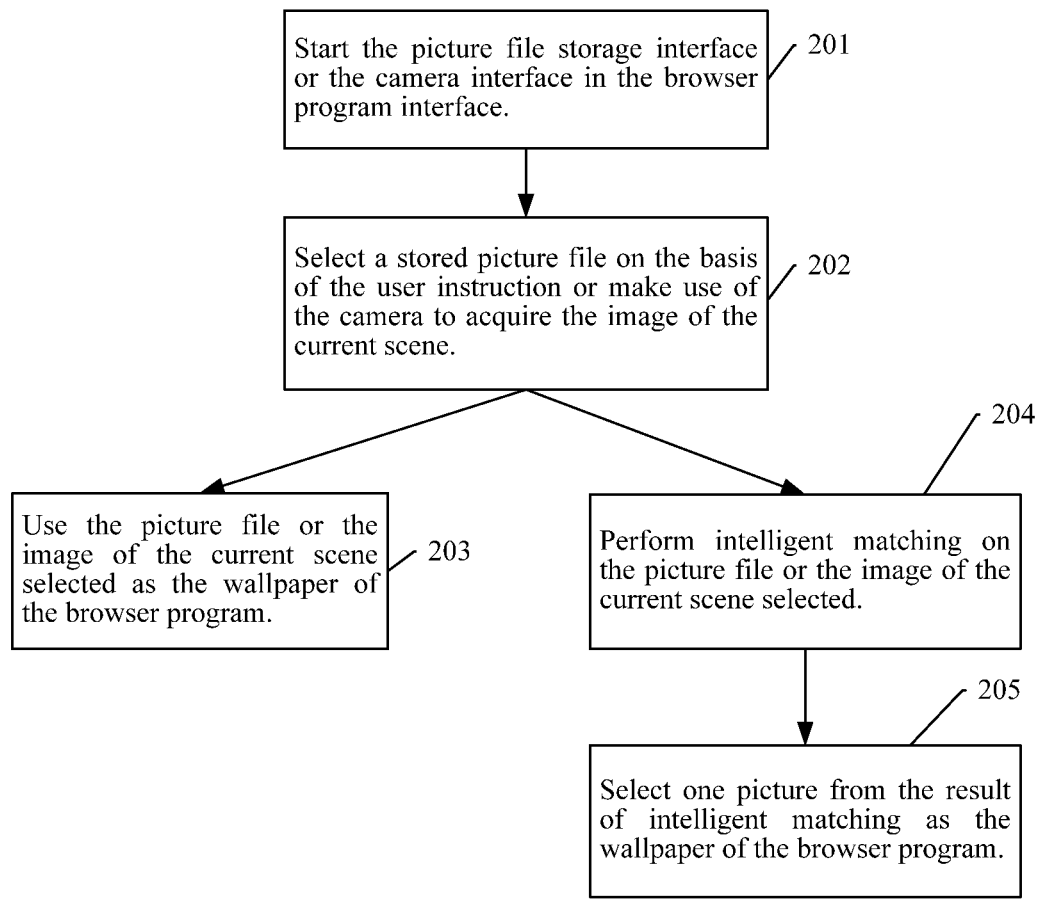
FIG. 2 is an example flowchart for an embodiment of the present disclosure.

In the embodiments, the application is specifically a browser program, which allows the user to directly start the picture file storage interface or the camera interface in the browser program interface. As shown in FIG. 2, the realization flowchart for Embodiment 1 includes the following steps:

Step 201: Start the picture file storage interface or the camera interface in the browser program interface. The mode for starting the picture file storage interface or the camera interface may include: via the traditional path, namely the menu-corresponding function icon or list text, or may include: via some shortcut keys or shortcut gestures.

Step 202: If what Step 201 starts is the picture file storage interface, a stored picture file is selected on the basis of the user instruction. If what Step 201 starts is the camera interface, the camera is used to acquire the image of the current scene.

Thereafter, execute Step 203 or Step 204 based on the user instruction.

Step 203: The picture file or the image of the current scene as selected is used as the wallpaper of the browser program based on the user instruction, and when being set as the wallpaper, the picture may also be locally edited and adjusted, including but not limited to cropping of the picture content and adjustment of the color, brightness and contrast that are the basic attributes of the picture. At this time, replacement of the application visual control is completed, and the current flow comes to an end.

Step 204: Intelligent matching is performed on the picture file or the image of the current scene as selected on the basis of the user instruction.

In order to realize intelligent matching, a large number of pictures are stored in advance in local or remote servers, and these pictures may respectively belong to different subjects or correspond to different labels.

Corresponding subjects may be found through finding similar pictures, or through extracting the key color or key part of the picture file or the image of the current scene as selected so as to acquire the picture belonging to the subject (may be done by way of local or online searching). The realization mode thereof may include extraction of the pixel color at several positions of a certain portion of the picture file or the image of the current scene as selected, and may also be matching with the result the same as or similar to the color information through making judgment on the image content, and then displaying the matching picture in the result list.

Or, it may acquire the key color or the key part of the picture file or the image of the current scene as selected, generate of a corresponding label based on the key color or the key part, find the picture to which this label corresponds, and display the picture to which this label corresponds as the matching picture in the result list.

For example, the camera is used to acquire the image of a falling leaf; the corresponding label is found to be "Autumn" based on the falling leaf in the image, the pictures labeled as "Autumn" stored in local or remote servers are searched, and the found picture is the result of performing intelligent matching on the currently acquired image.

Step 205: Based on the user instruction, one picture is selected from the result of intelligent matching as the wallpaper of the browser program, realizing the replacement of the browser program visual control.

For example, some or all of the pictures as found labeled as "Autumn" are displayed, and the user selects one picture from the displayed result as the wallpaper of the browser program to realize the replacement of the browser program visual control.

In Step 204, the data used at the time of intelligent matching may include dynamically configured and updated, including current event data push.

In addition, when intelligent matching is performed, other data of the user system may also be called; for example, making use of the GPS sensor to acquire the current position or making use of the light sensor to acquire the current light condition, and these data are further used for intelligent matching. For example, in Step 204, the picture that matches the information on the current position or the current light condition may be further selected from the pictures belonging to the subject to which the key color or the key part corresponds, and the selected picture is used as the result of intelligent matching. For example, after all the pictures labeled as "Autumn" are found, if the current light as acquired by making use of the light sensor is relatively dark, the picture with the content of "Autumn Evening" may be selected from all the pictures found, and the selected picture is used as the result of intelligent matching.

Figure 3:
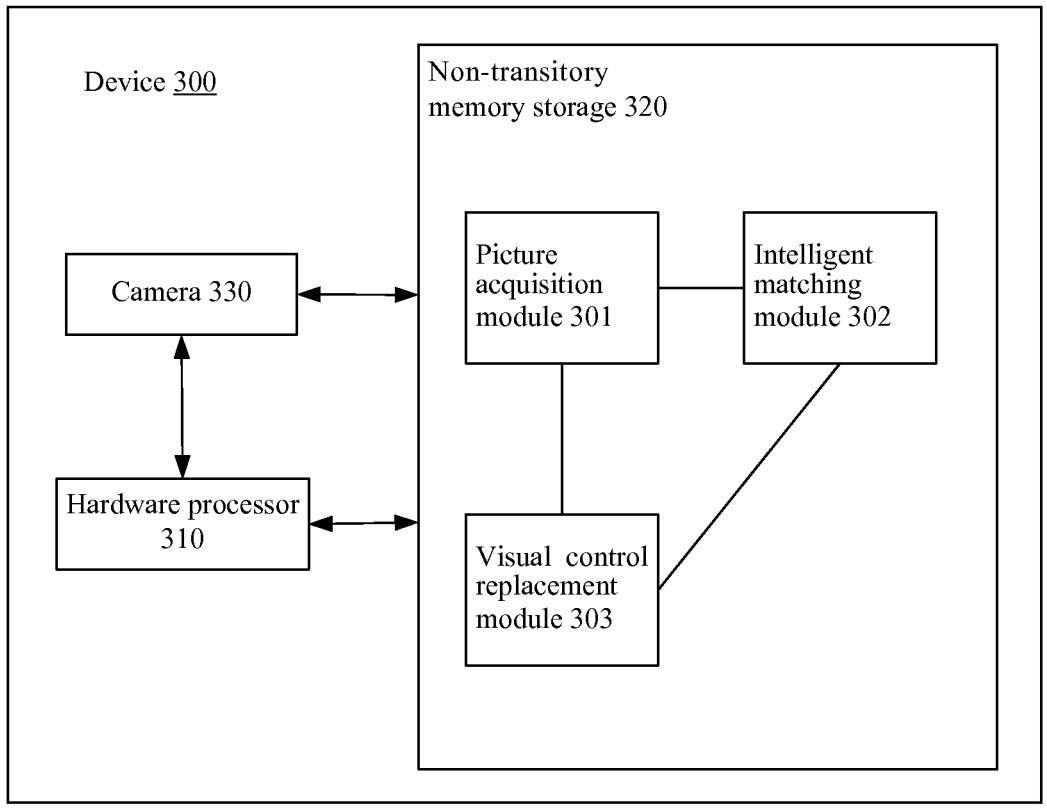
FIG. 3 is an example structural diagram of a device for replacing the application visual control as brought forth in the present disclosure.

The present disclosure has also brought forth a device 300 for replacing the application visual control, and as shown in FIG. 3. The device 300 includes a hardware processor 310 and a non-transitory storage medium 320 accessible to the hardware processor. The device 300 may also include a camera 330 that is configured to acquire images. The non-transitory storage medium 320 is configured to store the following modules implemented by the hardware processor 310.

A picture acquisition module 301, configured to extract the stored picture file or make use of the camera to acquire the image of the current scene;

An intelligent matching module 302, configured to perform intelligent matching on the picture file or the image of the current scene;

A visual control replacement module 303, configured to replace the visual control of the application based on the picture file or the image of the current scene; or, replace the visual control of the application based on the result of the intelligent matching.

In the device, the mode for the visual control replacement module 303 to replace the application visual control based on the picture file or the image of the current scene may be:

Editing and adjusting the picture file or the image of the current scene, and using the picture generated after editing and adjustment as the background image of the application.

The mode for the visual control replacement module 303 to edit and adjust the picture file or the image of the current scene may include:

Performing cropping, brightness adjustment, color adjustment or contrast adjustment on the picture file or the image of the current scene.

In the device, the mode for the intelligent matching module 302 to perform intelligent matching on the picture file or the image of the current scene may include: Acquiring the key color or the key part of the picture file or image of the current scene, finding the corresponding relation stored in advance of the color or part with the subject based on the key color or key part, acquiring the subject to which the key color or key part corresponds, and using the picture belonging to the subject as the result of intelligent matching;

The mode for the visual control replacement module 303 to replace the application visual control based on the result of intelligent matching may include: Displaying the result of the intelligent matching, and selecting one picture therein as the background image of the application based on the user instruction.

In the device, the intelligent matching module 302 may further acquire the information on the current position or the current light condition, select the picture that matches the information on the current position or current light condition from the pictures belonging to the subject to which the key color or key part corresponds, and use the selected picture as the result of intelligent matching.

Figure 4:
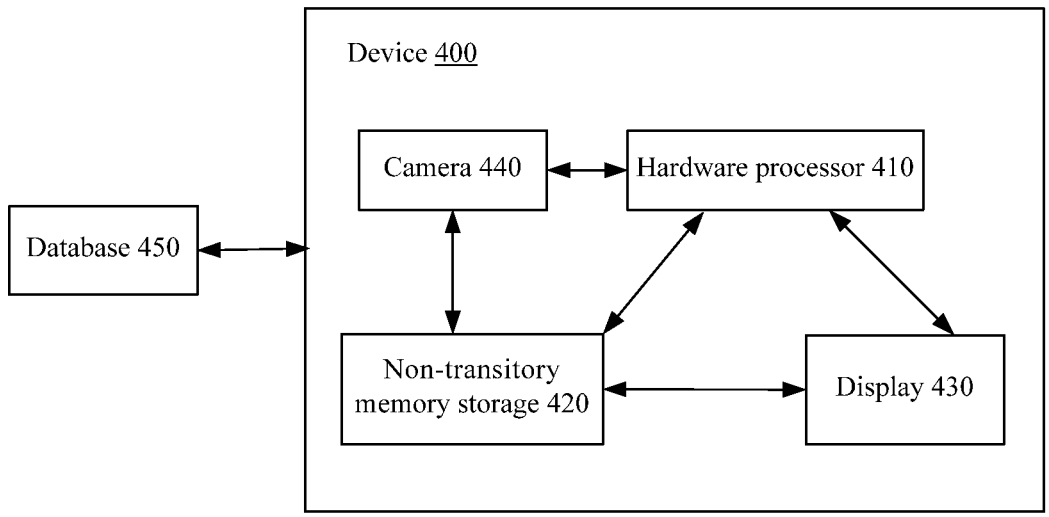
FIG. 4 is an example structural diagram of a system for replacing the application visual control as brought forth in the present disclosure.

FIG. 4 is an example structural diagram of a system for replacing the application visual control as brought forth in the present disclosure. The system includes a device 400 and a database 450 accessible to the device 400. The device 400 may access the database via a communication channel such as a wireless communication or any other communication methods. The device 400 includes a hardware processor 410 and a non-transitory storage medium 420 accessible to the hardware processor. The device 400 may also include a display 430 and a camera 440 that is configured to acquire images. The display may be configured to display the acquired images and other applications installed in the device 400.

For example, the device 400 may include an application configured to retrieve, present, and transfer online information. The application may be a web browser, a communication application, a social-network application, or other applications. The system may also include a database 450 configured to store a plurality of subjects and corresponding pictures. The device 400 is configured to: obtain an image of a current scene; perform intelligent matching on the image of the current scene; and change a visual control of the application based on a result of the intelligent matching.

As can be seen, the method, device, and system in the present disclosure may change the application visual control directly based on a stored picture file or an image of the current scene acquired by the camera. The device may change the application visual control based on the result of performing intelligent matching on the stored picture file or the image of the current scene acquired by the camera, so as to realize more convenient replacement of the definable visual control in the application.

As a summary of what has been mentioned above, the method and device as brought forth in the present disclosure for replacing the application visual control enable replacement of the application visual control directly based on the stored picture file or the image of the current scene acquired by the camera, or performance of intelligent matching on the stored picture file or the image of the current scene acquired by the camera, and replacement of the application visual control based on the result of matching. In this manner, the definable visual control in the application may be conveniently replaced, and the range for selectable visual controls may be greatly expanded.

The aforesaid are only the relatively preferred embodiments of the present disclosure and are not used to limit the present disclosure. Any modification, equivalent replacement, improvement, etc. within the spirit and principles of the present disclosure shall be covered by the protective scope of the present disclosure.

What is claimed is:

1. A method for dynamically and adaptively replacing a background image of an application in a terminal device having a processor, comprising:
    automatically and periodically obtaining, by the terminal device, an image of a current surrounding scene of the terminal device using a camera installed in the terminal device and a corresponding current surrounding light condition using a light sensor installed in the terminal device; and
    upon automatically and periodically obtaining the image of the current surrounding scene of the terminal device and the corresponding current surrounding light condition, automatically selecting and replacing the background image of the application in the terminal device based on the current surrounding scene and the corresponding current surrounding light condition by:
        performing, automatically and periodically by the terminal device using an image classifier, intelligent classification of the image of the current surrounding scene as belonging to an image subject among a plurality of predetermined image subjects based on a key color of the image of the current surrounding scene;
        identifying, automatically and periodically by the terminal device, from an image database, a set of images belonging to the image subject;
        selecting a target image from the set of images belonging to the image subject having a lighting condition that matches corresponding current surrounding light condition of the current surrounding scene; and
        replacing, automatically and periodically by the terminal device, the background image of the application with the target image,
        wherein the background image of the application comprises a wallpaper for the application.

2. The method of claim 1, further comprising:
    editing the image of the current surrounding scene to obtain an edited image and performing the intelligent classification of the edited image.

3. The method of claim 2, wherein editing the image of the current surrounding scene comprises:
    performing at least one of cropping, brightness adjustment, color adjustment or contrast adjustment on the image of the current surrounding scene.

4. The method of claim 1, wherein performing intelligent classification the image of the current surrounding scene comprises:
    acquiring a feature of the image of the current surrounding scene from a content of the current surrounding image;
    identifying a preset subject corresponding to the feature based on a stored relation between subjects and features; and
    classifying the image of the current surrounding scene as belonging to the preset subject matter, wherein the feature comprises the key color.

5. The method of claim 4, wherein replacing the background image of the application with the target image selected from the set of images belonging to the image subject comprises:
    displaying the set of images belonging to the image subject, and selecting the target image from the set of images as the background image of the application according to a user instruction.

6. The method of claim 4, wherein acquiring the feature of the image of the current surrounding scene further comprises:
    acquiring information related to a current geographic position as the feature of the image of the current surrounding scene.

7. A device for dynamically and adaptively replacing a background image an application of the device, comprising a processor and a non-transitory storage medium configured to store the following modules implemented by the processor:
    a picture acquisition module, configured to automatically and periodically obtain an image of a current surrounding scene of the device;
    a light condition sensor for automatically and periodically obtaining a corresponding current surrounding light condition using a light sensor installed in the device;
    an intelligent image classification and background image replacement module, configured to, upon automatically and periodically obtaining the image of the current surrounding scene of the device and the corresponding current surrounding light condition, automatically select and replace the background image of the application in the terminal device based on the current surrounding scene and the corresponding current surrounding light condition by:
        performing, automatically and periodically, intelligent classification of the image of the current surrounding scene as belonging to an image subject among a plurality of predetermined image subjects based on a key color of the image of the current surrounding scene;
        identifying, automatically and periodically, from an image database, a set of images belonging to the image subject;
        selecting a target image from the set of images belonging to the image subject having a light condition that matches corresponding current surrounding light condition of the current surrounding scene; and
        replacing periodically and automatically the background image of the application with the target image,
        wherein the background image of the application comprises a wallpaper for the application.

8. The device of claim 7, wherein the intelligent image classification and background image replacement module is further configured to:
    edit the image of the current surrounding scene to obtain an edited image and perform the intelligent classification of the edited image.

9. The device of claim 8, wherein the intelligent image classification and background image replacement module, when configured to edit the image of the current surrounding scene, is configured to perform at least one of the following to the image of the current surrounding scene:
cropping, brightness adjustment, color adjustment, and contrast adjustment.

10. The device of claim 7, wherein the intelligent image classification and background image replacement module, when configured to perform intelligent classification of the image of the current surrounding scene, is configured to:
acquire a feature of the image of the current surrounding scene from a content of the current surrounding image;
identify a preset subject corresponding to the feature based on a stored relation between subjects and features; and
classify the image of the current surrounding scene as belong to the preset subject matter, wherein the feature comprises the key color.

11. The device of claim 7, wherein the intelligent image classification and background image replacement module, when automatically replacing the background image of the application, is configured to:
display the set of images belonging to the image subject; and
select the target image from the set of images as the background image of the application according to a user instruction.

12. The device of claim 10, wherein the intelligent image classification and background image replacement module, when acquiring the feature of the image of the current surrounding scene, is configured to:
acquire information related to a current geographic position as the feature of the image of the current surrounding scene.

13. A system, comprising a device having a processor and a non-transitory storage medium configured to store the following modules implemented by the processor:
an application in the device configured to retrieve, present, and transfer online information;
a database configured to store a plurality of subjects and corresponding pictures;
wherein the device is configured to:
automatically and periodically obtain an image of a current surrounding scene of the terminal device using a camera installed in the device and a corresponding current surrounding light condition using a light sensor installed in the device; and
upon obtaining the image of the current surrounding scene of the device and the corresponding current surrounding condition, automatically selecting and replacing the background image of the application in the terminal device based on the current surrounding scene and the corresponding current surrounding light condition by:
performing, automatically and periodically, intelligent classification of the image of the current surrounding scene using an image classifier as belonging to an image subject among a plurality of predetermined image subjects based on a key color of the image of the current surrounding scene;
identifying, automatically and periodically, from the database, a set of images belonging to the image subject;
selecting a target image from the set of images belonging to the image subject having a light condition that matches corresponding current surrounding light condition of the current surrounding scene; and
replacing, automatically and periodically, a background image of the application with the target image,
wherein the background image of the application comprises a wallpaper for the application.

14. The system of claim 13, wherein the device is further configured to:
edit the image of the current surrounding scene to obtain an edited image and performing the intelligent classification of the edited image.

15. The system of claim 14, wherein the device is configured to edit the image of the current surrounding scene by performing at least one of:
cropping, brightness adjustment, color adjustment, and contrast adjustment.

16. The system of claim 13, wherein the device, when performing intelligent classification of the image of the current surrounding scene, is configured to:
acquire a feature of the image of the current surrounding scene from a content of the current surrounding image;
identify, in the database, a preset subject corresponding to the feature based on a stored relation between subjects and features; and
classify the image of the current surrounding scene as belonging to the preset subject matter, wherein the feature comprises the key color.

17. The system of claim 13, wherein the device, when replacing the background image of the application, is configured to:
display the set of images belonging to the image subject; and
select the target image from the set of images as the background image of the application according to a user instruction.

18. The system of claim 16, wherein the device, when acquiring the feature of the image of the current surrounding scene, is configured to:
acquire information related to a current geographic position as the feature of the image of the current surrounding scene.

* * * * *